United States Patent
Serpedin et al.

(10) Patent No.: US 11,855,444 B2
(45) Date of Patent: Dec. 26, 2023

(54) FUNCTIONAL SAFETY MECHANISM FOR DETECTION OF A FAULT IN A LEADFRAME

(71) Applicant: Infineon Technologies AG, Neubiberg (DE)

(72) Inventors: Ozan Serpedin, Constanta (RO); Cristian Garbossa, Bressanone (IT)

(73) Assignee: Infineon Technologies AG, Neubiberg (DE)

( * ) Notice: Subject to any disclaimer, the term of this patent is extended or adjusted under 35 U.S.C. 154(b) by 307 days.

(21) Appl. No.: 17/226,737

(22) Filed: Apr. 9, 2021

(65) Prior Publication Data

US 2022/0329060 A1 Oct. 13, 2022

(51) Int. Cl.
*H02H 7/00* (2006.01)
*H02H 7/12* (2006.01)
*H02H 1/00* (2006.01)
*G05F 1/56* (2006.01)

(52) U.S. Cl.
CPC .............. *H02H 7/1213* (2013.01); *G05F 1/56* (2013.01); *H02H 1/0007* (2013.01)

(58) Field of Classification Search
None
See application file for complete search history.

(56) References Cited

U.S. PATENT DOCUMENTS

| | | | | |
|---|---|---|---|---|
| 5,105,182 A | * | 4/1992 | Shindo | H02H 3/247 361/89 |
| 2009/0254297 A1 | * | 10/2009 | Bengtsson | G01R 27/16 702/117 |
| 2010/0085029 A1 | * | 4/2010 | Xie | H02M 3/156 323/299 |

OTHER PUBLICATIONS

Texas Instruments, "Understanding the Terms and Definitions of LDO Voltage Regulators," Application Report, SLVA079, Oct. 1999, 13 pp.

(Continued)

*Primary Examiner* — Stephen W Jackson
(74) *Attorney, Agent, or Firm* — Shumaker & Sieffert, P.A.

(57) ABSTRACT

A system topology may use intentional signal injection to monitor one or more power supply circuits that may supply electrical power to components of the system. The system topology may include voltage monitoring circuitry to monitor the output of the power supply. In some examples, a power supply rail fault may happen either inside or outside of the power supply circuit, but not be detectable by the voltage monitoring circuitry. Injecting a check signal in the presence of an actual fault, may cause oscillations at the output node of the power supply detectable by the voltage monitoring circuitry. Once the check signal, combined with the fault signal, at the output node reaches the monitoring threshold detectable by the voltage monitoring circuitry, the voltage monitoring circuitry may output an indication of the fault to processing circuitry of the system.

20 Claims, 8 Drawing Sheets

(56) References Cited

OTHER PUBLICATIONS

Texas Instruments, "Understanding Low Drop Out (LDO) Regulators," SLUP239A, 2006, 9 pp. (Applicant points but, in accordance with MPEP 609.04(a), that the year of publication, 2006, is sufficiently earlier than the effective U.S. filing date, so that the particular month of publication is not in issue.).

Morita, "Understand Low-Dropout Regulator (LDO) Concepts to Achieve Optimal Designs," Analog Dialogue 48-12, Dec. 2014, 6 pp.

Synopsys, "What is ASIL?," retrieved from https://www.synopsys.com/automotive/what-is-asil.html on Apr. 8, 2021, 7 pp.

* cited by examiner

FUNCTIONAL SAFETY MECHANISM FOR DETECTION OF A FAULT IN A LEADFRAME

TECHNICAL FIELD

The disclosure relates fault detection for linear power supplies.

BACKGROUND

Power supplies may be subject to faults such as single point faults. Single point faults may be classified into undervoltage, overvoltage and overcurrent faults. Some systems that use power supplies may include power supply monitoring to detect whether the power supplies are functioning as expected or may have developed a fault.

SUMMARY

In general, the disclosure describes a system topology and an intentional check signal injection to monitor one or more power supply circuits that may supply electrical power to components of the system. The system topology may include voltage monitoring circuitry to monitor the output of the power supply. In some examples a power supply rail fault may occur either inside or outside of the power supply circuit, but the fault may not be detectable by the voltage monitoring circuitry. Injecting a check signal in the presence of an actual fault, may cause oscillations at the output node of the power supply detectable by the voltage monitoring circuitry. Once a check signal, combined with the fault signal, at the output node reaches the monitoring threshold detectable by the voltage monitoring circuitry, the voltage monitoring circuitry may output an indication of the fault to processing circuitry of the system.

In one example, this disclosure describes a system that includes a power converter comprising an output terminal and configured to receive an input voltage at a first magnitude and output a voltage at a second magnitude at the output terminal; a voltage monitoring circuit coupled to the output terminal; and a signal injection circuit coupled to the output terminal, the signal injection circuit configured to input a check signal; wherein the voltage monitoring circuit is configured to detect a fault signal at the output terminal based on the combined fault signal and the check signal satisfying a detection threshold.

In another example, this disclosure describes a circuit that includes a power converter comprising an output terminal and configured to receive an input voltage at a first magnitude and output a voltage at a second magnitude at the output terminal; a voltage monitoring circuit coupled to the output terminal; and a signal injection circuit coupled to the output terminal, the signal injection circuit configured to input a check signal, wherein the voltage monitoring circuit is configured to detect a fault signal at the output terminal based on the combined fault signal and the check signal satisfying a detection threshold.

In another example, this disclosure describes a method comprising injecting a check signal at an output terminal of a power converter circuit; monitoring, by a voltage monitoring circuit, an output voltage at the output terminal, detecting, by the voltage monitoring circuit, a fault signal at the output terminal based on the combined fault signal and the check signal satisfying a detection threshold outputting, by the voltage monitoring circuit and to the processing circuitry, an indication that the voltage monitoring circuit detected the fault signal; in response to receiving the indication from the voltage monitoring circuit, placing, by the processing circuitry, the power converter into a fail-safe state.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
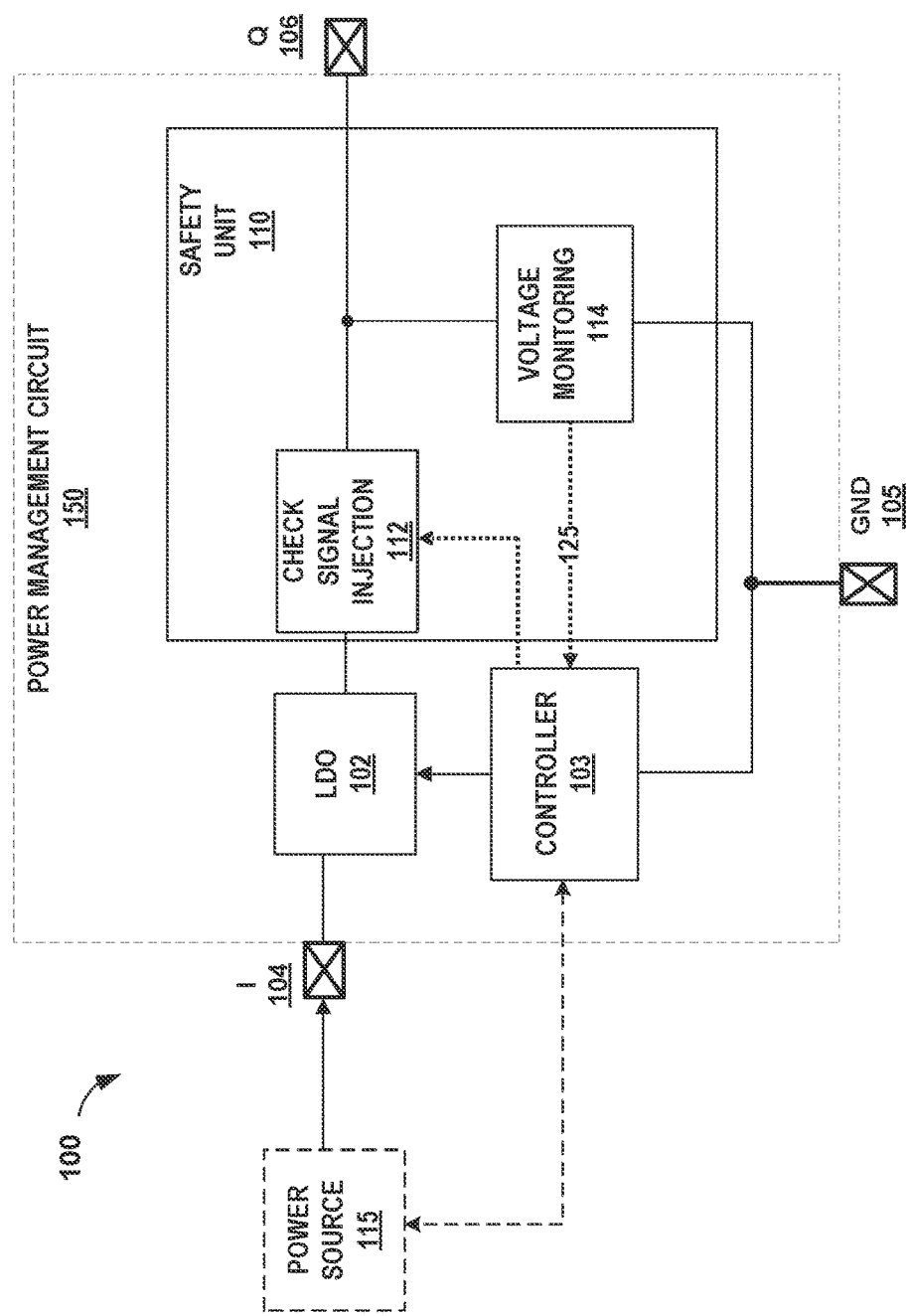
FIG. 1 is a block diagram illustrating a power supply circuit with a check signal injection according to one or more techniques of this disclosure.

The disclosure describes a system topology that uses a intentional signal injection to monitor one or more power supply circuits that may supply electrical power to components of the system. The system topology may include monitoring circuitry to monitor the output of the power supply and may inject a check signal, configured such that the injected check signal makes a fault in the circuit easier to detect.

A power supply rail fault can occur either within or external to the power supply circuit, yet not be detectable by the voltage monitoring circuitry. In some cases, faults may not be detectable because of frequency band limitations, or because of the arrangement of the power supply circuit. In particular, the detectable frequency band, the detection domain, may be limited by the intrinsic propagation delay of the components, such as comparators, which the voltage monitoring circuit may use for detection. In some cases, the frequency band limitation may be the result of a trade-off between the bandwidth of the comparators and low quiescent constraints imposed by the system.

Some of the factors that may lead to faults may be classified as external factors or internal factors. In the example of a linear regulator, external factors may include a loss of connection to the output capacitor due to bad connection or damage of the output capacitor. In some examples, the linear regulator may include an output capacitor to keep a regulation loop of the linear regulator stable.

Some examples of internal factors may include interruption of the connection between the power supply circuit and printed circuit board (PCB) to which it is mounted. For example, power supply circuit leadframe connection or a bond wire between the power supply circuit and the PCB may fail and become disconnected, e.g., caused by mechanical stress or aging.

For other examples of a monitoring circuit, for an oscillation frequency outside the detection domain, the monitoring circuitry may use a window comparator to detect a possible fault at the output voltage rail. However, even with a window comparator, only oscillations or peaks with amplitudes larger than the valid range thresholds (set in the monitoring circuit) are detectable. Therefore, a drawback of the window comparator is that in certain conditions the oscillation amplitudes that are desired to be detected are much smaller than the threshold of the monitoring circuit. As noted above, in other examples, the arrangement of the power supply circuit (e.g., capacitorless power supply or with an on-chip embedded capacitor) may not output detectable oscillations at the output node, even with an oscillation monitoring circuit that has a larger detection domain.

In contrast, the monitoring circuitry of this disclosure may periodically inject a check signal, which may be configured such that the check signal may be similar to an actual fault signal in some respects. However, the check signal may be controlled with known characteristics such that the check signal may emphasize the presence of a fault. The power supply circuit may continue to supply power to a load while injecting the check signal, but no fault is present. In some examples, the check signal comprises a simulation of an overvoltage fault.

By injecting the check signal, when in the presence of an actual fault, the circuitry of this disclosure may cause oscillations at the output node of the power supply that is detectable by the monitoring circuitry. With the combined actual fault and check signal, the fault signal at the output node may reach the monitoring threshold detectable by the voltage monitoring circuitry and the voltage monitoring circuitry may output an indication of the actual fault to a logic controller of the system.

FIG. 1 is a block diagram illustrating a power supply circuit with check signal injection according to one or more techniques of this disclosure. System 100 may supply power to operate systems in a variety of applications including vehicles, such as aircraft, automobiles, as well as industrial and other applications. In some examples, a fault in system 100 may supply unstable power to downstream components. In the example components and systems subject to ISO 26262, which defines functional safety for the different electrical and electronics systems in a vehicle, a power supply, such as system 100, that supplies such components and systems may be configured with safety features to monitor the supplied output power. The arrangement of system 100 may provide advantages when compared to other power supply circuits.

System 100 includes a power management circuit 150 with safety unit 110 arranged with a topology including an internal check signal injection circuit 112 and a monitoring and reaction block, voltage monitoring circuit 114. Power management circuit may also include a linear regulator, such as low-drop out (LDO) converter 102, which is a type of power converter. In some examples, system 100 may include a DC power source 115 that supplies power to input terminal I 104, such as a battery, or a power converter, such as an AC-DC converter or a DC-DC converter. The arrangement of the components of system 100 are just one example arrangement of the power supply circuit of this disclosure. In other examples, system 100 may include more or fewer components, and may be arranged differently. For example, safety unit 110 may be depicted as part of LDO 102.

In the example of FIG. 1, power management circuit 150 receives an input voltage at a first magnitude at input terminal I 104 and may output a voltage at a second magnitude at output terminal Q 106. Voltage monitoring circuit 114 is coupled to output terminal Q 106. Check signal injection circuit 112 is also coupled to output terminal Q 106. Input terminal I 104 connects to an input terminal of LDO 102. LDO 102 connects to output terminal Q 106 through check signal injection circuit 112. Controller 103 may send control signals to LDO 102, check signal injection circuit 112 and may receive sensing signals from voltage monitoring circuit 114. Power management circuit 150 may also include a reference terminal, GND 105, connected to one or more components to power management circuit 150. In the example of system 100, GND 105 connects to controller 103 and voltage monitoring circuit 114. In some examples, portions of power management circuit 150, or the entire power management circuit, may be implemented as an integrated circuit (IC).

Low-dropout regulator, LDO 102 may receive the input voltage at the first magnitude, e.g., from power source 115, and output a voltage at a second magnitude at output terminal Q 106. In some examples, LDO 102 is a power converter that may operate to isolate a load connected to Q 106 from a dirty or noisy source connected to I 104. In other examples, LDO 102 may act as a low-noise source to power sensitive circuitry connected to output terminal Q 106.

Controller 103 may include one or more processors. Examples of processor in controller 103 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Controller 103 may include an internal memory, or connect to an external memory (not shown in FIG. 1). Examples of a memory may include any type of computer-readable storage media such as random access memory (RAM), read only memory (ROM), programmable read only memory (PROM), erasable programmable read only memory (EPROM), one-time programmable (OTP) memory, electronically erasable programmable read only memory (EEPROM), flash memory, or another type of volatile or nonvolatile memory device. In some examples the computer readable storage media may store instructions that cause the processing circuitry to execute the functions described herein. In some examples, the computer readable storage media may store data, such as configuration information, temporary values and other types of data used to perform the functions of this disclosure.

The check signal injected by check signal injection circuit 112 may have characteristics of an analog fault. Controller 103 may cause check signal injection circuit 112 to inject the check signal during operation of power converter LDO 102, rather than just monitoring the output voltage rail connected to Q 106. As noted above, in some cases, a fault may be difficult to detect. In some examples, controller 103 may cause check signal injection circuit 112 to periodically inject the check signal e.g., every minute, every second, at fraction of a second intervals, and so on. By performing this measure, a fault caused by an internal failure of the IC, such as an open leadframe, or caused by a component failure, may be highlighted to controller 103 by increasing an amplitude of an oscillation at the output node, Q 106.

Voltage monitoring circuit 114 may be configured to detect a fault signal at output terminal Q 106 based on the combination of an actual fault signal and the check signal satisfying a detection threshold. In other words, during the system operation, power management circuit 150 output node Q 106 is continuously supervised by voltage monitoring circuit 114. Therefore, once the signal at output node Q 106 reaches the monitoring threshold, voltage monitoring circuit 114 may trigger a reaction and send an indication 125 to controller 103. In turn, controller 103 may control LDO 102 to place put power management circuit 150 into a fail-safe state. In some examples, controller 103 may cause LDO 102 to power down, e.g., disable the output and/or reduce the output at Q 106 to zero to achieve the fail-safe state.

Safety unit 110, with check signal injection circuit 112 and voltage monitoring circuit 114, may be configured such that the check signal from check signal injection circuit 112 alone does not satisfy a detection threshold of voltage monitoring circuit 114. Said another way, although voltage monitoring circuit 114 may receive both the circuit output from LDO 102 and the check signal from check signal injection circuit 112 connected to output terminal Q 106, voltage monitoring circuit 114 may ignore the check signal because the check signal does not satisfy the detection threshold. Only in the presence of a fault signal may the combined fault signal and check signal satisfy the detection threshold. The fault signal may be in indication of a circuit related issue with the output capacitor (not shown in FIG. 1) e.g., a high impedance connection either within power management circuit 150, or in connections from output terminal Q 106 to a PCB or lead frame. In some examples, controller 103 may be configured to cause signal injection circuit 112 to periodically input the check signal to Q 106. When the combined check signal and fault signal exceeds the detection threshold, controller 103 may receive an indication from the voltage monitoring circuit that the voltage monitoring circuit detected the fault signal. As noted above, in response to receiving the indication, controller 103 may put power management circuit 150 in a fail-safe state.

In example of a power management with an LDO, as depicted in FIG. 1, an external output capacitor (not shown in FIG. 1) may connect to output terminal Q 106 to keep a regulation loop for power management circuit 150 stable. The loss of the connection to the output capacitor, or if the capacitor fails, may produce oscillations of the regulation loop, and cause power management circuit 150 to output an unstable voltage and/or current. This type of event represents a fault because the oscillations may affect the availability of the supply rails or the proper functionality of downstream components. In some supply applications, factors that may cause the fault can may be classified as external factors or internal factors. External factors may include a high impedance connection, such as a partial or complete loss of connection to the output capacitor caused by bad connection or damage of the output capacitor. Damage or failure of the output capacitor may result from capacitor leakage, internal shorts causing a failure, or a change in capacitance, and so on. Internal factors may include interruption of the connection between the power management circuit and application printed circuit board to which it is connected. For example, a solder, conductive adhesive or bond wire connection failure caused by mechanical stress or aging may cause a high impedance connection.

In some examples of other types of circuits, some faults may not be detectable because of frequency band limitations, or because of the arrangement of the other power supply circuit (e.g., capacitorless power supply or with an on-chip embedded capacitor). In examples of circuits that use a window comparator a drawback of the window comparator is that in certain conditions the oscillation amplitudes that are desired to be detected are much smaller than the threshold of the monitoring circuit.

In contrast, system 100 may provide advantages over other types of power supply circuits configured to comply with safety standards. The use of check signal injection circuit 112 technique may enable the development of safety mechanisms, e.g., safety units comprising circuitry, which are independent of oscillation frequency, amplitude, voltage regulator topology, solving the disadvantages of other solutions. Furthermore, power management circuit 150 may offer the extended coverage of safety relevant requirements for multiple voltage rails (e.g., for both pre-regulators and post-regulators which are part of a supply system) without increasing the pin count. By maintaining the pin count on a lead frame, e.g., by not adding extra pins for monitoring, power management circuit 150 of this disclosure may provide a cost-effective alternative to other types of circuits that may increase the package pin count.

An example application of system 100 and power management circuit 150 may include an ASIL-D rated power supply system. ASIL is an automotive safety integrity level risk classification scheme ISO 26262. ASIL-D represents the highest level of risk management, so components or systems that are developed for ASIL-D are made to the most stringent safety requirements, when compared to ASIL-A, B and C. Three factors determine the ASIL requirement for a particular system. The first is severity. Severity considers the safety consequences on the driver, passengers or nearby pedestrians and vehicles that were system to fail or malfunction. The second is probability of exposure or the likelihood of an operational situation that can be hazardous for the failure mode under analysis. The third factor is controllability. Controllability considers the ability to avoid a harm through the timely reactions of the persons involved in the operational situation (driver, passengers or persons in the vicinity of the vehicle) in case of a system failure or malfunction.

Figure 2:
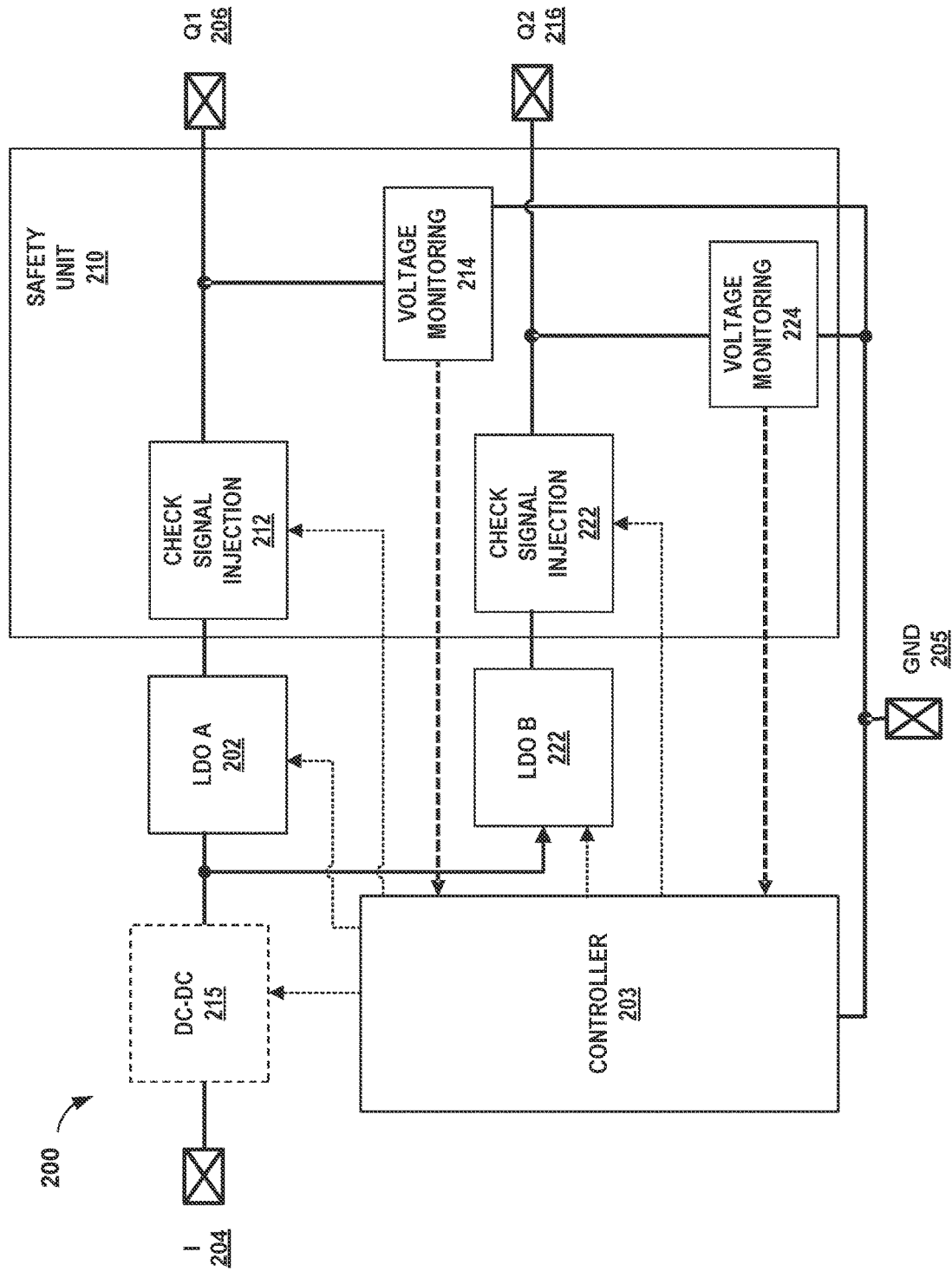
FIG. 2 is a block diagram illustrating a system comprising multiple power supply circuits configured to perform signal injection according to one or more techniques of this disclosure.

FIG. 2 is a block diagram illustrating a system comprising multiple power supply circuits that are configured to perform signal injection according to one or more techniques of this disclosure. System 200 is an example of system 100 described above in relation to FIG. 1. The example of FIG. 2 depicts two separate power supply output terminals, Q1 206 and Q2 216 supplied by two linear regulators, LDO A 202 and LDO B 222, respectively. Each linear regulator LDO A 202 and LDO B 222, receives the same input voltage output from DC-DC supply 215. In other examples, system 200 may have multiple DC voltage inputs at multiple different voltage magnitudes and the input voltage to LDO A 202 may be different from LDO B 222 (not shown in FIG. 1). In some examples, the magnitude of voltage at Q1 206 may be different from the magnitude of voltage at Q2 216.

In other examples, the magnitude of output voltage may be different for Q1 206 and Q2 216.

Although shown in FIG. 2 with two power management circuits, in other examples, system 200 may include any number of power management circuits (not shown in FIG. 2). In some examples, one or more of the power management circuits may receive the same input voltage. In other examples, each power management circuit may receive a separate input voltage with a different voltage magnitude. Likewise, for one or more power management circuits of system 100 the output voltage magnitude may have approximately the same magnitude in some examples. In other examples, each power management circuit of system 200 may output a voltage at a different magnitude. In the disclosure, "approximately" the same means the values are equal, within measurement and manufacturing tolerances. Manufacturing methods, temperature, different types of materials, changing atmospheric pressures, and other factors can cause some small differences in circuit performance.

The example of system 100 may be considered a pre-regulator arrangement. The example of system 200, may be considered a post-regulator arrangement. In the example of system 200, DC-DC supply 215 receives an input voltage from input terminal I 204. DC-DC supply 215 outputs power to the input terminals of LDO A 202 and LDO B 222. As described above in relation to FIG. 1, LDO A 202 outputs a voltage to output terminal Q1 206 through check signal injection circuit 212. Voltage monitoring circuit is coupled to output terminal Q1 206. The arrangement of LDO A 202, check signal injection circuit 212 and voltage monitoring circuit 214 with output terminal Q1 206 may be considered an example of power management circuit 150 described above in relation to FIG. 1.

Similarly, voltage monitoring circuit 224 is coupled to output terminal Q 216. Check signal injection circuit 222 is also coupled to output terminal Q 216. The input terminal of LDO B 222 receives the power output from DC-DC supply 215. LDO B 222 connects to output terminal Q 216 through check signal injection circuit 222. Safety unit 210, in the example of FIG. 2 includes check signal injection circuit 212 and voltage monitoring circuit 214 for output terminal Q1 206 and check signal injection circuit 222 and voltage monitoring circuit 224 for output terminal 216.

Controller 203 may send control signals to LDO A 102, LDO B 222, check signal injection circuits 212 and 222 and may receive sensing signals from voltage monitoring circuits 214 and 224. Power management circuit 150 may also include a reference terminal, GND 205, connected to one or more components to power management circuit 150. In the example of system 200, GND 205 connects to controller 203 and voltage monitoring circuit 214 and 225. In some examples, multiple power management circuits in FIG. 2 may be implemented as an integrated circuit (IC).

As described above in relation to FIG. 1, in some examples, DC-DC supply 215 may be implemented as a DC-DC power management that receives a first voltage magnitude and outputs a second voltage magnitude. In other examples, DC-DC supply 215 may be a battery, or other electrical energy storage element. In other examples, DC-DC supply 215 may be omitted from system 200.

In operation, system 100 functions as described above in relation to system 100 in FIG. 1. Each power management of system 200 may receive an input voltage at a first magnitude, e.g., from DC-DC supply 215, and output a voltage at a second magnitude each respective output terminal, Q1 206 and Q2 216. Voltage monitoring circuits 214 and 224 coupled to each respective output terminal, Q1 206 and Q2 216 may detect a respective fault signal at the output terminal based on the combined fault signal and the check signal satisfying a detection threshold.

In some examples, controller 203, as with controller 103 of FIG. 1, may periodically cause check signal injection circuit 212 and/or check signal injection circuit 222 to output the check signal. Controller 203 may periodically command a check signal every second, every few minutes, after a predetermined run time, multiple times per second, and so on. The period may depend on the likelihood and severity of a fault for a given circuit. In other examples, controller 203 may initiate the check signal only during start-up, only once at a predetermined delay after start-up, after detecting a specified event, or based on other criteria. In some examples, sensitive downstream circuitry supplied by the output terminals may be affected by noise placed on the output supply caused by the check signal.

Figure 3:
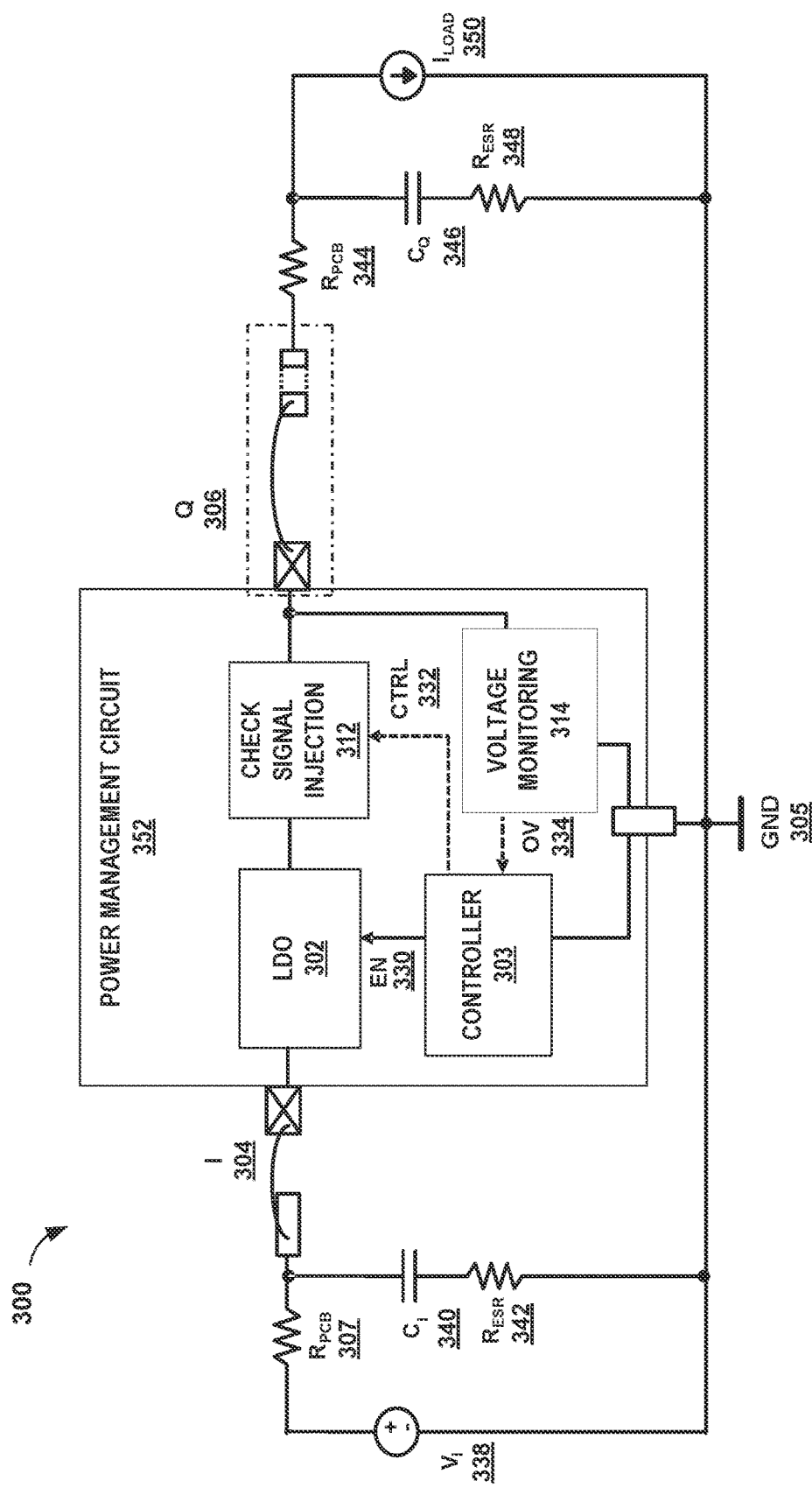
FIG. 3 is a block diagram illustrating a system with a power supply circuit including signal injection and external components according to one or more techniques of this disclosure.

FIG. 3 is a block diagram illustrating a system with a power supply circuit including signal injection and external components according to one or more techniques of this disclosure. System 300 is an example of system 100, described above in relation to FIG. 1 and may have similar functions and characteristics.

As with system 100, system 300 includes power management circuit 352 with input terminal I 304, output terminal Q 306 and a reference terminal GND 305. In the example of FIG. 3 power management circuit also includes a power converter, LDO 302, and a safety unit including check signal injection circuit 312 and voltage monitoring circuit 314. In some examples, power management circuit 352 may be implemented as an integrated circuit.

Controller 303 is an example of controller 103 of FIG. 1 and may include processing circuitry that controls the operation of LDO 302, check signal injection circuit 312 and voltage monitoring circuit 314. Examples of control signals may include enable signal EN 330 and control signal 332. Controller 303 may also receive signals from LDO 302, check signal injection circuit 312 and voltage monitoring circuit 314 indicating status, output voltage, and fault indication, e.g., over voltage indication OV 334. The nature of the control signals and other signals of power management circuit 352 may depend on the specific implementation of the components of power management circuit 352, e.g., digital signals, master-slave signals, analog signals, and so on.

Input voltage Vi 338 connects to input terminal I 304 through resistor Rpcb 307. Rpcb 307 may model the resistance of the circuit board traces and connections. In the example of FIG. 3, the connection from the PCB to the power management input terminal I 304 and output terminal Q 306 is depicted as a wire bond. In other examples, the connection may consist of a solder, e.g., solder paste or a solder ball, conductive adhesive, e.g., silver epoxy, or some other connection.

Input capacitor Ci 340 connects I 304 to GND 305 through resistor Resr 342. Resr 342 may model the equivalent series resistance (ESR) of input capacitor Ci 340. Output terminal Q 306 connects to output capacitor Cq 346 through resistor Rpcb 344. Similar to Rpcb 307, Rpcb 344 may model the resistance of the connections to the circuit board. Output terminal Q 306 connects to GND 305 through a series arrangement of Cq 346 and resistor Resr 348. Resistor Resr 348 may model the ESR of output capacitor Cq 346. Power from output terminal Q 306 from power management circuit 352 supplies the load, Iload 350.

In operation, power management circuit 352 may function in a similar way as power management circuit 150 described above in relation to FIG. 1. The output node Q 306 of power management circuit 352 is continuously supervised by voltage monitoring circuit 314. Once a fault signal at output node Q 306 reaches the monitoring threshold, voltage monitoring circuit 314 may trigger a reaction and send an indication OV 334 to controller 303. In turn, controller 303 may control LDO 302 to place power management circuit 352 into a fail-safe state. As described above in relation to FIGS. 1 and 2, in some examples, a fault signal, e.g., caused by a high impedance connection go output capacitor Cq 346, may not be detected by voltage monitoring circuit 314, except when the check signal from check signal injection circuit 312 is present. In some examples, indication OV 334 may indicate an overvoltage condition at the output terminal 306 of power management circuit 352.

Figure 4:
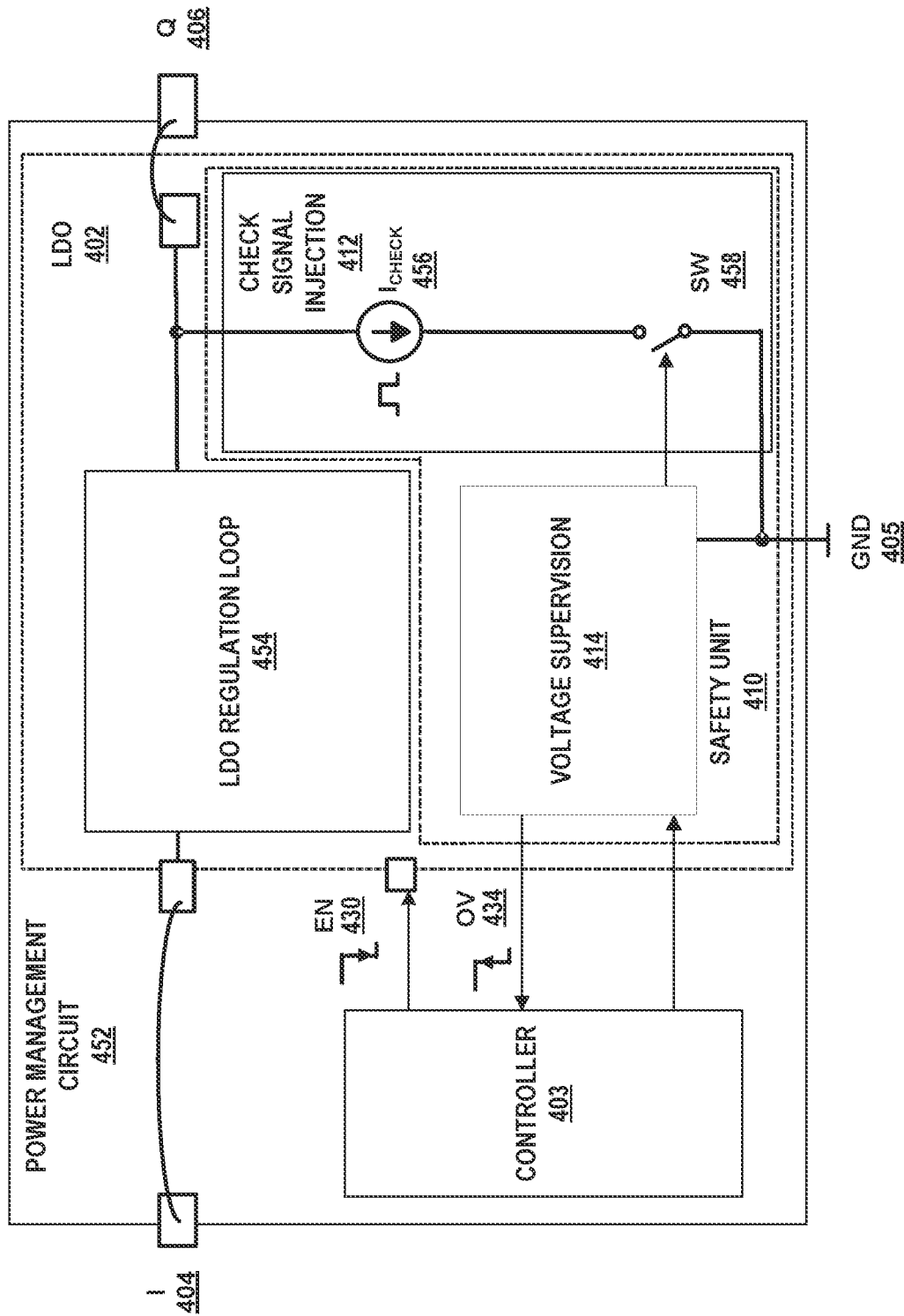
FIG. 4 is a block diagram illustrating an example implementation of power supply circuit with signal injection according to one or more techniques of this disclosure.

FIG. 4 is a block diagram illustrating an example implementation of power supply circuit with signal injection according to one or more techniques of this disclosure. Power management circuit 452 is an example of power management circuits 150 and 352 described above in relation to FIGS. 1 and 3 as well as the power management circuits of system 200 depicted in FIG. 2. The example of FIG. 4 depicts safety unit 410 as part of power converter LDO 402.

As with system 100 and system 300, power management circuit 452 may include input terminal I 404, output terminal Q 406 and a reference terminal GND 405. In the example of FIG. 4 power management circuit also includes a power converter, LDO 402 with safety unit 410 and LDO regulation loop 454. Safety unit 410 includes check signal injection circuit 412 and voltage supervision circuit 414. Voltage supervision circuit 414 is an example of voltage monitoring circuits 114, 214, 224 and 314 described above in relation to FIGS. 1-3. In some examples, power management circuit 452 may be implemented as an integrated circuit.

Controller 403 is an example of controller 103 of FIG. 1 and may include processing circuitry that controls the operation of LDO 402, check signal injection circuit 412 and voltage supervision circuit 414. Examples of control signals may include enable signal EN 430 and other control signals not shown in FIG. 4. Controller 403 may also receive signals from LDO 402 such as the fault indication OV 434. In the example of FIG. 4 control signal EN 430 enables the output of LDO 402 when signal EN 430 transitions from HIGH to LOW. When signal OV 434 transitions from LOW to HIGH, controller 403 receives an indication of a fault. In other examples, the control and indication signals may be configured in a different manner than described in the example of FIG. 4. As with controller 103, controller 403 may communicate with other systems and processing circuitry not shown in FIG. 4. In the example of a vehicle, controller 403 may communicate with a body control unit (BCU), engine control unit (ECU) or other systems to receive commands, communicate status, warnings and so on.

LDO 402 includes LDO regulation loop 454, and safety unit 410, which includes voltage supervision circuit 414 and check signal injection circuit 412. Voltage supervision circuit 414 may receive commands from controller 403 and output signal OV 434. Voltage supervision circuit 414 may also controls switch SW 458 of check signal injection circuit 412. Switch SW 458 connects the check signal current source Icheck 456 to ground, GND 405, when SW 458 is closed. A second terminal of Icheck 456 connects to output terminal Q 406. The output of LDO regulation loop 454 connects to output terminal Q 406.

In the example of FIG. 4, the bond wire connects Q 406 to LDO 402. If the bond wire breaks, then components, such as an output capacitor described above in relation to FIG. 3, may disconnect from LDO 402, and cause instability in the output voltage from LDO 402, as described above in relation to FIG. 3.

In operation, voltage supervision circuit 414 may cause SW 458 to close, allowing the check signal, Icheck 456 to flow from output terminal Q 406 to GND 405. In some examples, controller 403 may command voltage supervision circuit 414 to close SW 458. In some examples, voltage supervision circuit 414 may periodically close SW 458, for example once per second. In other examples, voltage supervision circuit 414 may only close SW 458 during startup, or during other times as described above in relation to FIG. 2. With the combined actual fault and check signal, Icheck 456, a fault signal at the output node may reach the monitoring threshold detectable by the voltage monitoring circuitry and the voltage monitoring circuitry may output an indication of the actual fault to a logic controller of the system.

Figure 5:
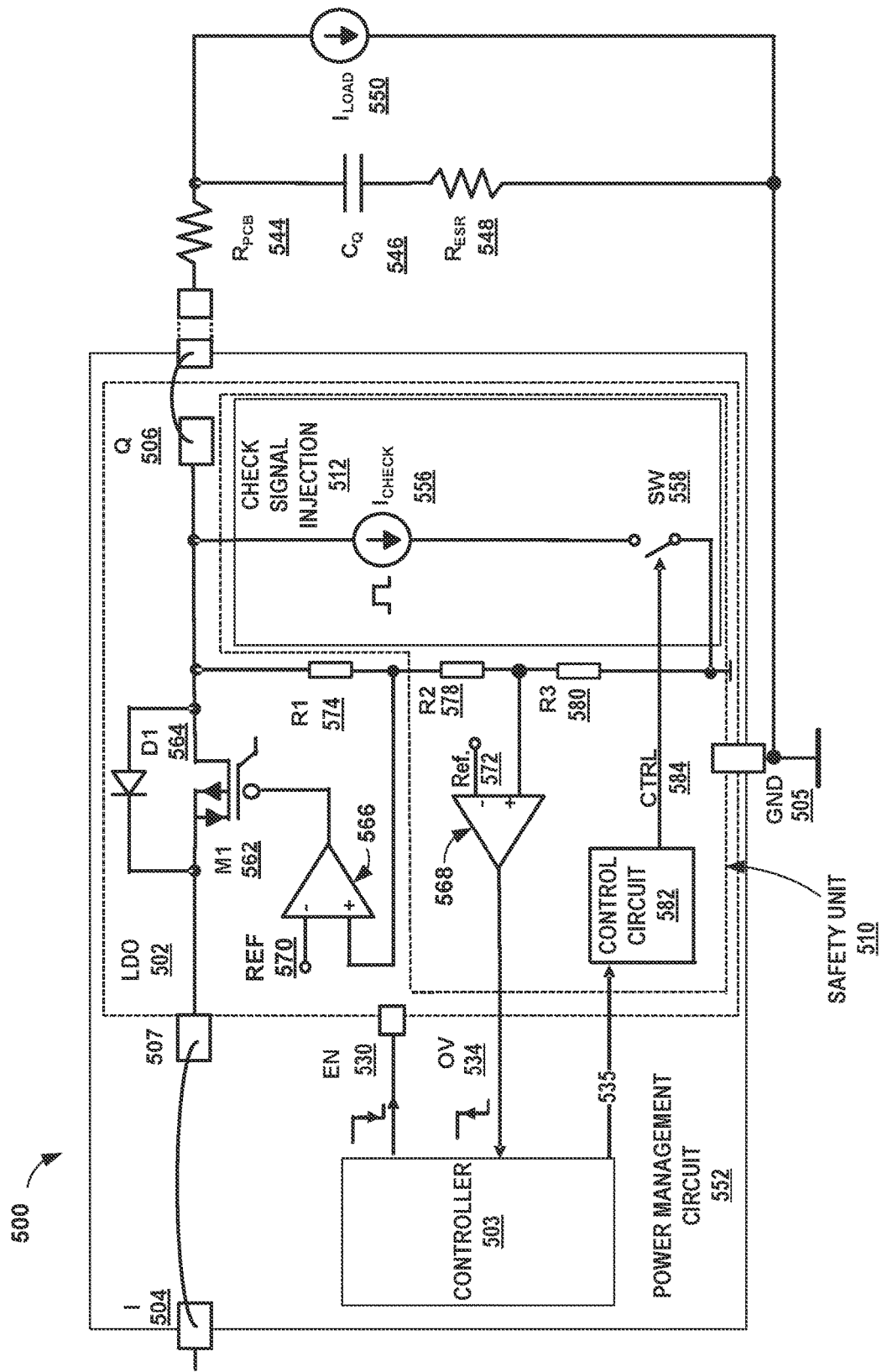
FIG. 5 is a block diagram illustrating an example implementation of a signal injection circuit according to one or more techniques of this disclosure.

FIG. 5 is a block diagram illustrating an example implementation of a signal injection circuit according to this disclosure. System 500 is an example of system 100, 300 and 400, described above and includes power management circuit 552. Power management circuit 552 is an example of the power management circuits described above in relation to FIGS. 1-4 as well as the power management circuits of system 200 depicted in FIG. 2. Any of the arrangements and components described in FIGS. 1-5 may be interchanged with any of the other configurations described above in relation to FIGS. 1-4.

Power management circuit 552 may include input terminal I 504, output terminal Q 506 and a reference terminal GND 505. In the example of FIG. 5 power management circuit also includes a power converter, LDO 502 with safety unit 510. Safety unit 510 includes check signal injection circuit 512. In some examples, power management circuit 552 may be implemented as an integrated circuit.

Controller 503 is an example of controller 103 of FIG. 1 and may include processing circuitry that controls the operation of LDO 502, check signal injection circuit 512 and other components of power management circuit 552. Examples of control signals may include enable signal EN 530, signal 535 and other control signals not shown in FIG. 4. Controller 503 may also receive signals from LDO 502 such as the fault indication OV 534. In the example of FIG. 5 control signal EN 530 enables the output of LDO 502 when signal EN 530 transitions from HIGH to LOW. When signal OV 534 transitions from LOW to HIGH, controller 503 receives an indication of a fault, as described above in relation to FIG. 4. In other examples, the control and indication signals may be configured in a different manner than described in the example of FIG. 5. As with controller 103, controller 503 may communicate with other systems and processing circuitry not shown in FIG. 5.

LDO 502 receives an input voltage from input terminal I 504 via a wire bond, in the example of FIG. 5. In other examples, the input 507 to LDO 502 may receive the input voltage via other connection techniques such as a conductive clip, jumper, solder joint, conductive adhesive, and so on. Input 507 connects to a source of a pass element M1 562, which in the example of FIG. 5 is a P-channel metal oxide semiconductor transistor (PMOS). A cathode of diode D1 564 connects to the source of transistor M1 562 and the anode of D1 564 connects to the drain of M1 562. The drain of M1 562 is the output of LDO 502 and connects to output terminal Q 506.

Output terminal Q 506 also connects to the reference terminal, e.g., GND 505 through a series arrangement of resistors R1 574, R2 578 and R3 580. A first terminal of R1 574 connects to Q 506. The non-inverting input of error amplifier 566 receives the voltage at the node between R1 574 and R2 578. The output of error amplifier 566 controls the gate of pass element M1 562 based on the difference between the voltage at the non-inverting input of error amplifier 566 and the reference voltage 570 connected to the inverting input to error amplifier 566. The voltage divider formed by resistors R1 574, R2 578 and R3 580, along with error amplifier 566 connected to the gate of transistor M1 562 forms the regulation loop for LDO 502, similar to LDO regulation loop 454 described above in relation to FIG. 4.

The non-inverting input of comparator 568 receives the voltage at the node between R2 578 and R3 580. Comparator 568 receives a reference voltage 572 at the inverting input. Therefore, the fault indication signal OV 534 to controller 503 is based on the difference between reference voltage 572 and the voltage divider formed at the node between R2 578 and R3 580. Comparator 568 forms a portion of the voltage monitoring circuit of LDO 502, as in the example of voltage monitoring circuits 114, 214, 224, 314 and 414 described above in relation to FIGS. 1-4.

Control circuit 582 of safety unit 510 receives a command signal 535 from controller 503. Based on signal 535, control circuit 582 may control the operation of switch SW 558, to connect the check signal from current source Icheck 556 to ground. When control circuit 582 asserts CTRL 584 to close SW 558, then check signal current flows from output terminal Q 506 to GND 505. The check signal current may also be described as an analog load jump signal because closing SW 558 may appear to the LDO regulation loop as an increase, or jump, in the load current.

A load, depicted as Iload 550, receives power from LDO 502 from output terminal Q 506. Output terminal Q 506 connects to output capacitor Cq 546 through resistor Rpcb 544. As described above in relation to FIG. 3, Rpcb 544 may model the resistance of the connections to the circuit board. Output terminal Q 506 connects to GND 505 through a series arrangement of Cq 546 and resistor Resr 548. Resistor Resr 548 may model the ESR of output capacitor Cq 546.

As described above in relation to FIGS. 1-4, a fault signal may be in indication of a circuit related issue with output capacitor Cq 546, e.g., a high impedance connection either within power management circuit 552, or in connections from output terminal Q 506 to a PCB or leadframe. The monitoring threshold of safety unit 510 may be set by selecting the value for resistors R1 574, R2 578 and R3 580 and the magnitude of reference voltage 572. Once a fault signal at output node Q 506 reaches a value such that the voltage at the input to comparator 568 is greater than the magnitude of reference voltage 572, the output of comparator 568 may transition from LOW to HIGH and output signal OV 534 to controller 503. Controller 503 may control LDO 502 to place put power management circuit 552 into a fail-safe state, which in some examples may include disabling the output from output terminal Q 506, e.g., based on enable signal EN 530. As described above in relation to FIGS. 1-4, in some examples, the fault signal, may not be detected by voltage monitoring circuit including comparator 568, except when the check signal I check 556 from check signal injection circuit 512 is present.

As with any of systems 100-600 described in this disclosure, the specific arrangements are just one example implementation of a power management circuit that performs the functions described in this disclosure. In other examples, reference voltage 572 may connect to the non-inverting terminal of comparator 568 and the inverting terminal connected through a different arrangement of resistors. In other examples, the inputs to controller 503 may be to an analog to digital converter (ADC) rather than arrangement as shown.

Figure 6:
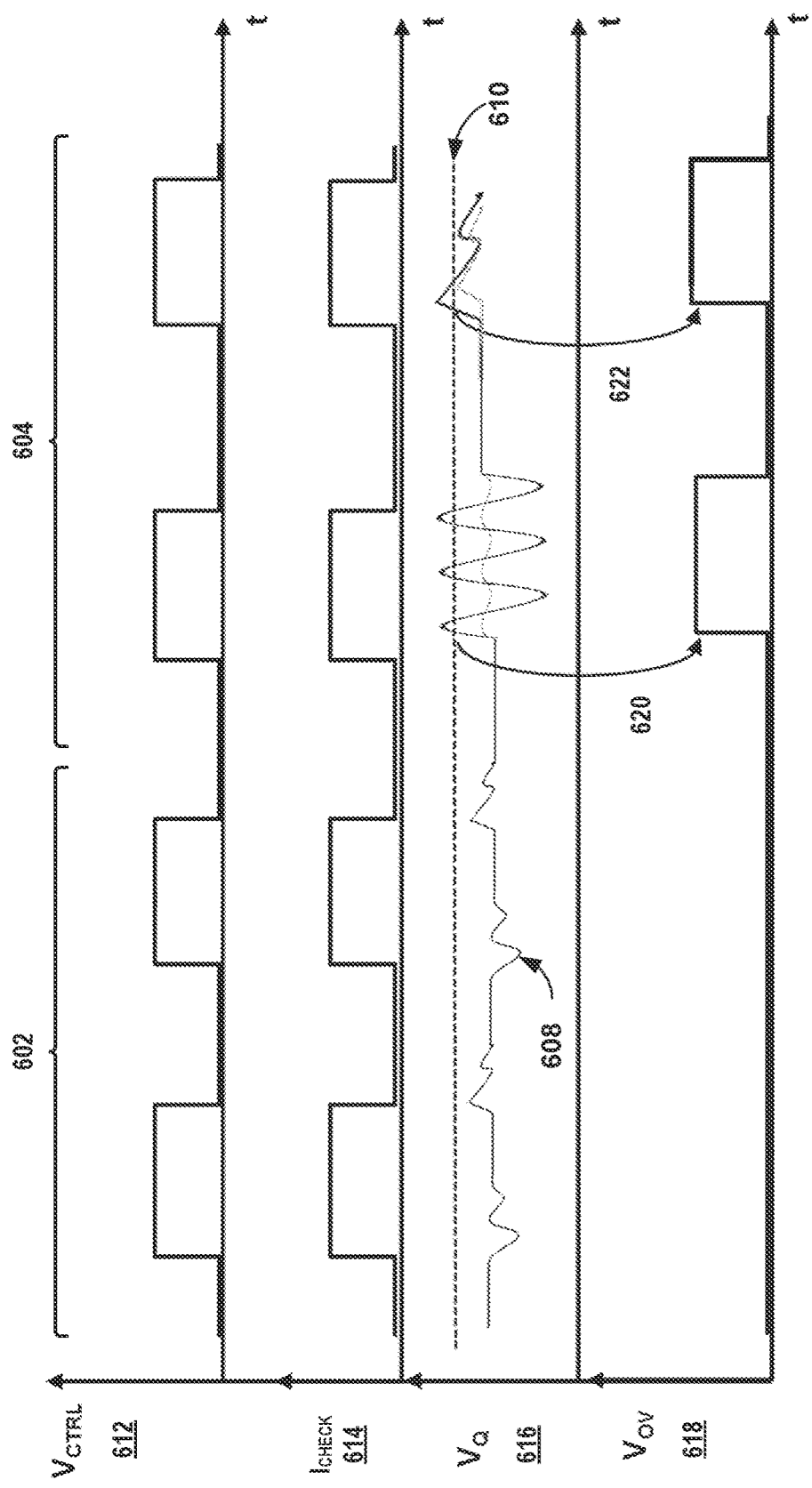
FIG. 6 is a timing diagram illustrating an example operation of a power supply circuit with signal injection according to one or more techniques of this disclosure.

FIG. 6 is a timing diagram illustrating an example operation of a power supply circuit with signal injection according to one or more techniques of this disclosure. The timing diagram of FIG. 6 will be described in terms of FIG. 5 but may illustrate the operation of any of systems 100-700 of this disclosure. In the example of FIG. 6, during time period 602, no fault is present in system 500, and during time period 604 a fault signal is present, which may be in indication of a circuit related issue with the output capacitor.

In some examples, the starting and control of the analog check signal injection may use a clock signal derived from the digital domain, for example, synchronized with the clock of the system (not shown in FIG. 6). This clock signal, Vctrl 612 may drive a switch, such as a MOS device, configured as a low-side switch, e.g., SW 558 depicted in FIG. 5. Vctrl 612 corresponds to the output of control circuit 582, CTRL 584 of FIG. 5. In other examples, controller 503 may cause SW 558 to close based on specific events, such as during start-up, shut-down, or other detected events, or when receiving a command from other portions system to which system 500 is connected, e.g., an ECU.

Closing SW 558 causes Icheck 614 to flow, which corresponds to current source Icheck 556 of FIG. 5. At the signal transitions of Icheck 614, e.g., from LOW to HIGH or from HIGH to LOW, the output voltage Vq 616 may include some voltage ripple, but safety unit 510 of FIG. 5 may be configured such that the voltage 608 does not exceed the monitoring threshold 610 of the voltage monitoring circuit during time period 602, when no fault is present. However, during time period 604, a fault, such as a high impedance connection at Vq 506 of FIG. 5, may cause the combined fault signal and check signal to exceed the monitoring threshold 610 as shown at 620 and 622. Once the amplitude reaches the safety thresholds, the voltage monitoring circuit including comparator 568 may react and change its state. Further this information is propagated to controller 503. Based on the received change in OV 534, controller 503 may react in such a way to put system 500 into a fail-safe state, such as to power-down LDO 502.

Figure 7:
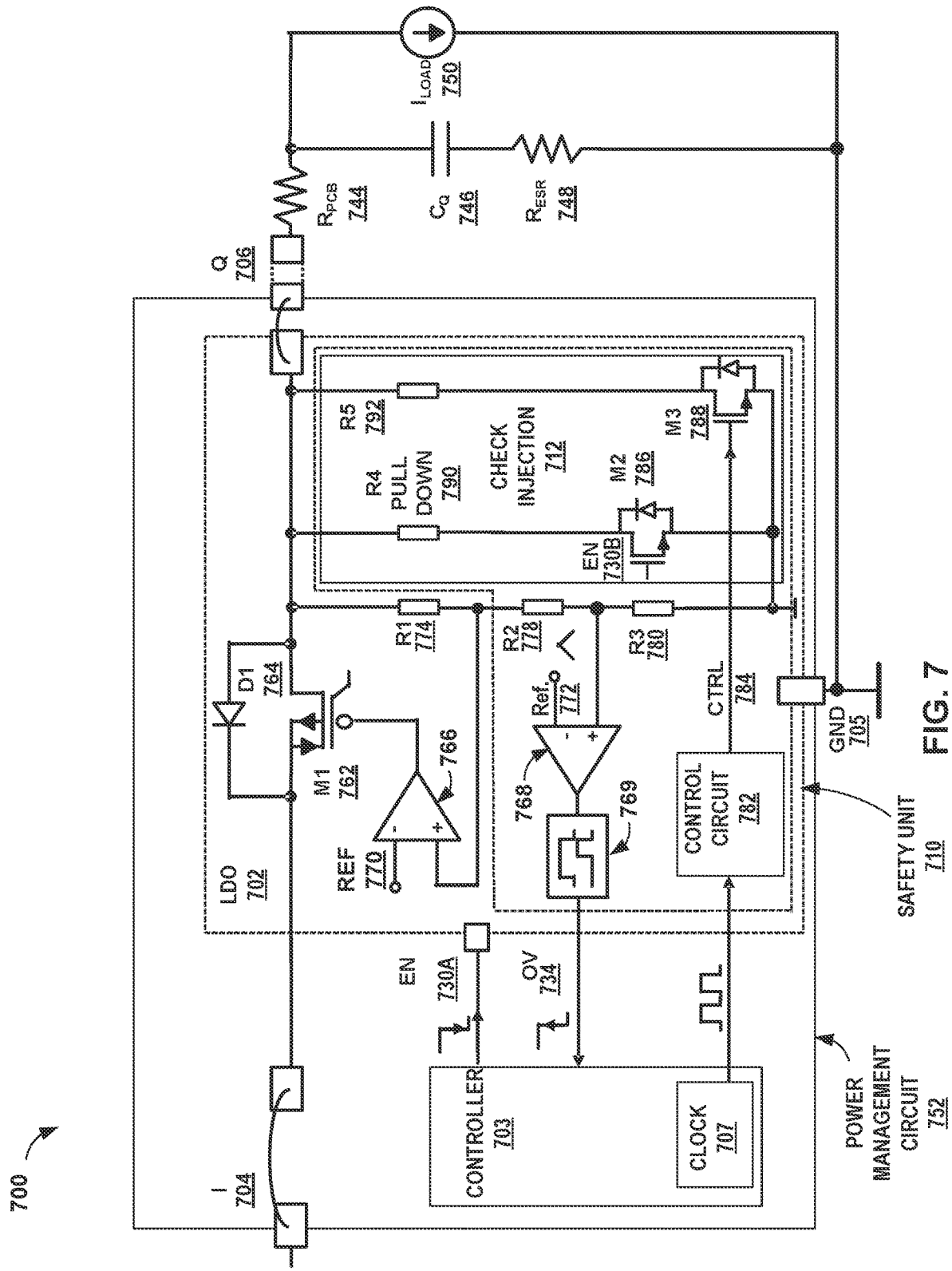
FIG. 7 is a block diagram illustrating a second example implementation of power supply circuit with signal injection according to one or more techniques of this disclosure.

FIG. 7 is a block diagram illustrating a second example implementation of power supply circuit with signal injection according to one or more techniques of this disclosure. System 700 is an example of system 100, 300, 400, and 500 described above and includes power management circuit 752. Power management circuit 752 is an example of the power management circuits described above in relation to FIGS. 1-5 as well as the power management circuits of system 200 depicted in FIG. 2. Any of the arrangements and components described in FIGS. 1-5 and 7 may be interchanged with any of the other configurations described above.

As with systems 100-500 described above, system 700 includes circuitry to inject an analog fault, a check signal, to detect a fault (open connection) in the leadframe during the entire operation of the voltage regulator. By injecting the check signal, the high impedance or missing connection to output capacitor Cq 746 may be emphasized, as described above in relation to FIG. 6. The check signal may stimulate the LDO regulation loop in a way that puts the voltage regulator of LDO 702 into an oscillation condition when the high impedance fault may be detected. The detected fault may provide an information to controller 703, which may cause controller 703 to put the system in to a fail-safe state.

Because the operation of safety unit 710 is independent on the response of LDO 702, then in case of a fault, no dedicated oscillation monitor is required, in contrast to other examples of fault detection circuitry. Therefore, a power management circuit that includes a safety unit, such as safety unit 710 may provide advantages over other examples of monitoring circuitry because the possibility of unwanted oscillations or of a failure of system 700 to detect that the power supplied by LDO 702 is unavailable may be reduced or eliminated.

Power management circuit 752 may include input terminal I 704, output terminal Q 706 and a reference terminal GND 705. In the example of FIG. 7 power management circuit also includes a power converter, LDO 702 with safety unit 710. Safety unit 710 includes check signal injection circuit 712. In some examples, power management circuit 752 may be implemented as an integrated circuit.

Controller 703 is an example of controller 103 of FIG. 1 and may include processing circuitry that controls the operation of LDO 702, check signal injection circuit 712 and other components of power management circuit 752. Examples of control signals may include enable signal EN 730A, the clock output from 707 and other control signals not shown in FIG. 4. Controller 703 may also receive signals from LDO 702 such as the fault indication OV 734. As with controller 103, controller 703 may communicate with other systems and processing circuitry not shown in FIG. 7.

In the example of FIG. 7 enable signal EN 730A enables the output of LDO 702 when signal EN 730A transitions from HIGH to LOW. The enable signal controls the gate of transistor M2 786. EN 730A connects to EN 730B. When the enable signal EN 730B transitions from HIGH to LOW, it shuts off transistor M2 786. When EN 730B is HIGH, transistor M2 786 is conducting and pulls the output terminal Q 706 to ground through pull down resistor R4 790, thereby disabling the output of LDO 702.

LDO 702 receives an input voltage from input terminal I 704 via a wire bond, in the example of FIG. 7. As described above in relation to FIG. 5 the input to LDO 702 may receive the input voltage via other connection techniques. The input to LDO 702 connects to a source of a pass element M1 762. A cathode of diode D1 764 connects to the source of transistor M1 762 and the anode of D1 764 connects to the drain of M1 762. The drain of M1 762 is the output of LDO 702 and connects to output terminal Q 706.

Output terminal Q 706 also connects to the reference terminal, e.g., GND 705 through a series arrangement of resistors R1 774, R2 778 and R3 780. A first terminal of R1 774 connects to Q 506. The non-inverting input of error amplifier 766 receives the voltage at the node between R1 774 and R2 778. The output of error amplifier 766 controls the gate of pass element M1 762 based on the difference between the voltage at the non-inverting input of error amplifier 766 and the reference voltage 770 connected to the inverting input to error amplifier 766. The voltage divider formed by resistors R1 774, R2 778 and R3 780, along with error amplifier 766 connected to the gate of transistor M1 762 forms the regulation loop for LDO 702, similar to LDO regulation loop 454 described above in relation to FIG. 4.

The non-inverting input of comparator 768 receives the voltage at the node between R2 778 and R3 780. Comparator 768 receives a reference voltage 772 at the inverting input. Therefore, the fault indication signal OV 734 to controller 703 is based on the difference between reference voltage 772 and the voltage divider formed at the node between R2 778 and R3 780. Comparator 768 forms a portion of the voltage monitoring circuit of LDO 702, as in the example of voltage monitoring circuits 114, 214, 224, 314 and 414 described above in relation to FIGS. 1-4. When signal OV 734 transitions from LOW to HIGH, controller 703 receives an indication of a fault, as described above in relation to FIGS. 4 and 5. In other examples, the control and indication signals may be configured in a different manner than described in the example of FIG. 7.

In the example of FIG. 7, control circuit 782 of safety unit 710 receives clock signal 707 from controller 703. Based on clock signal 707, control circuit 782 may control the operation of switch transistor M1 758, to cause the check signal current through R5 792 to flow, as described above in relation to FIG. 6.

The load, depicted as Iload 750, receives power from LDO 702 from output terminal Q 706. Output terminal Q 706 connects to output capacitor Cq 746 through resistor Rpcb 744. As described above in relation to FIGS. 3 and 5, Rpcb 744 may model the resistance of the connections to the circuit board. Output terminal Q 706 connects to GND 705 through a series arrangement of Cq 746 and resistor Resr 748. Resistor Resr 748 may model the ESR of output capacitor Cq 746.

In the example of FIG. 7 the starting and control of the check signal, e.g., an analog load jump injection, may use clock signal derived from the digital domain, as described above in relation to FIG. 6. The clock signal 707 may be synchronized with the clock of a system to which system 700 is connected (not shown in FIG. 7). The output from clock 707 may cause control circuitry 782 to output CTRL 784 that drives a MOS device, M3 788, which is configured as a low-side switch. The level of the internal load jump may be designed to stimulate the regulation loop of LDO 702 in a way that it can be handled by the loop in normal operation and but indicate a fault to controller 703 in a fault condition. To further limit the value of the internal load jump, a series resistor, R5 792 may be added in series to the transistor M3 788.

The monitoring function of power management circuit 752 in the example of FIG. 7, is implemented by a voltage comparator 786, that takes as input a fraction of the output voltage at output terminal Q 706. The values of resistors R1 774, R2 778 and R3 780, arranged in series as a voltage divider determine the value of the fraction. Comparator 786 receives reference voltage 772, which may be the same reference voltage used by the regulation loop, e.g., reference voltage 770, or may an independent safety bandgap.

To permit the logic controller, e.g., controller 703, to process the information and also to avoid potential glitches, the response of the comparator may be deglitched 769 on the positive edge. Safety unit 710, with check injection circuit 712 may the system to implement the functional safety requirements, which may be relevant for automotive systems that need to be ISO 26262 compliant, up to ASIL-D. In other words, the arrangement of power management circuit 752 may further mitigates risks that can appear in the system, caused by an unavailability of the supply voltage rails caused by internal or external faults. The detection of such single point faults may trigger controller 703 to react every time an event is detected. Therefore, the integrity of the system may be regularly checked and when a fault is detected, the system generates a reaction based on the associated fault severity level.

Figure 8:
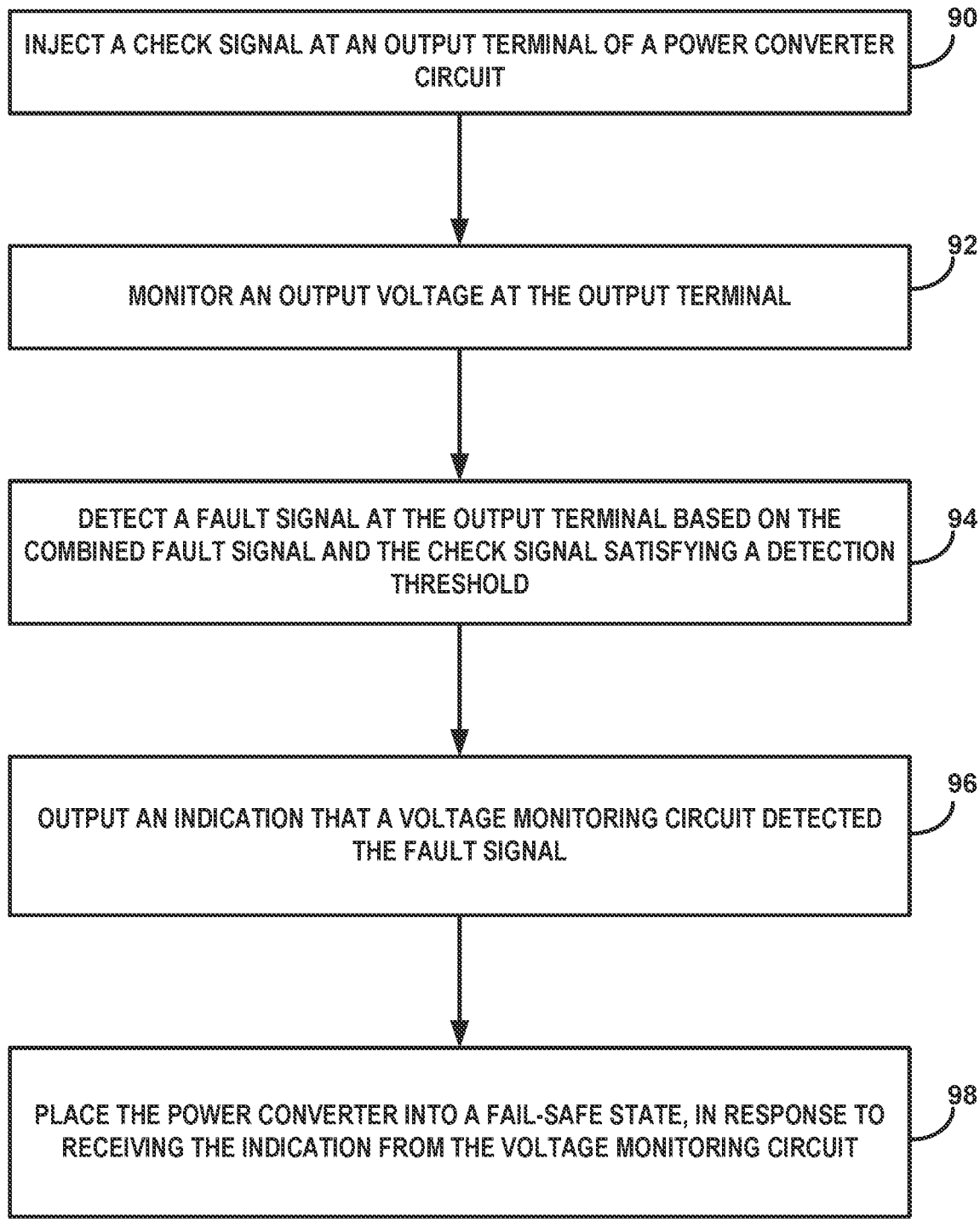
FIG. 8 is a flow chart illustrating the operation of a power supply circuit with signal injection according to one or more techniques of this disclosure.

FIG. 8 is a flow chart illustrating the operation of a power supply circuit with signal injection according to one or more techniques of this disclosure. The blocks of FIG. 8 will be described in terms of FIG. 1, but may apply to any of systems 100-700 of this disclosure.

As seen in the example of FIG. 8, check signal injection circuit 112 may inject a check signal at an output terminal Q 106 of a power converter circuit (90). In some examples, controller 103 may cause check signal circuit 112 to periodically inject the check signal throughout the operation of LDO 102, or only at certain times during operation.

Voltage monitoring circuit 114 may compare the output voltage at Q 106 to a reference voltage, as described above in relation to FIGS. 5-7 (92). In some examples a circuit issue such as a high impedance connection to an output capacitor, may not be detectable by voltage monitoring circuit 114, as described above in relation to FIG. 1. However, voltage monitoring circuit 114 may detect a fault signal at output terminal Q 106 based on the combined fault signal and the check signal satisfying a detection threshold (94).

Next, voltage monitoring circuit 114 may output to the processing circuitry, such as controller 103, an indication that the voltage monitoring circuit detected the fault signal (96). Further, controller 103, in response to receiving the indication from voltage monitoring circuit 114, may place the power converter, LDO 102 into a fail-safe state (98), such as to power down LDO 102 and/or disable the output of LDO 102, as described above in relation to FIG. 7.

In one or more examples, the functions described above may be implemented in hardware, software, firmware, or any combination thereof. For example, the various components of FIG. 5 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described The techniques of this disclosure may also be described in the following examples.

Example 1: A system includes a power converter comprising an output terminal and configured to receive an input voltage at a first magnitude and output a voltage at a second magnitude at the output terminal; a voltage monitoring circuit coupled to the output terminal; and a signal injection circuit coupled to the output terminal, the signal injection circuit configured to input a check signal; wherein the voltage monitoring circuit is configured to detect a fault signal at the output terminal based on the combined fault signal and the check signal satisfying a detection threshold.

Example 2: The system of example 1, wherein the power converter is a first power converter comprising an input terminal, the system further comprising a DC-DC power converter coupled to the input terminal of the first power converter.

Example 3: The system of any of examples 1 and 2, wherein the power converter is a first power converter, the system further comprising a second power converter wherein the second power converter is configured to receive a second input voltage of a third magnitude and output a voltage of a fourth magnitude at a second output terminal.

Example 4: The system of any combination of examples 1 through 3, further comprising an output capacitor coupled to the output terminal, wherein the fault signal is an indication of a circuit issue related to the output capacitor.

Example 5: The system of combination of examples 1 through 4, wherein the circuit issue comprises a high impedance connection to the output capacitor.

Example 6: The system of combination any of examples 1 through 5, further comprising processing circuitry configured to cause the signal injection circuit to periodically input the check signal; and receive an indication from the voltage monitoring circuit that the voltage monitoring circuit detected the fault signal.

Example 7: The system of combination of examples 1 through 6, wherein in response to receiving the indication, the processing circuitry is configured to put the power converter in a fail-safe state.

Example 8: The system of any combination of examples 1 through 7, wherein, in response to receiving the indication, the processing circuitry is configured to cause the power converter to power down.

Example 9: The system of any combination of examples 1 through 8, wherein the power converter comprises a linear power converter.

Example 10: The system of combination of examples 1 through 9, wherein the power converter comprises a low drop out (LDO) regulator.

Example 11: A circuit includes a power converter comprising an output terminal and configured to receive an input voltage at a first magnitude and output a voltage at a second magnitude at the output terminal; a voltage monitoring circuit coupled to the output terminal; and a signal injection circuit coupled to the output terminal, the signal injection circuit configured to input a check signal, wherein the voltage monitoring circuit is configured to detect a fault signal at the output terminal based on the combined fault signal and the check signal satisfying a detection threshold.

Example 12: The circuit of example 11, further includes cause the signal injection circuit to periodically input the check signal; and receive an indication from the voltage monitoring circuit that the voltage monitoring circuit detected the fault signal.

Example 13: The circuit of examples 11 and 12, wherein in response to receiving the indication, the processing circuitry is configured to put the power converter in a fail-safe state.

Example 14: The circuit of any combination of examples 11 through 13, wherein, in response to receiving the indication, the processing circuitry is configured to cause the power converter to power down.

Example 15: The circuit of any combination of examples 11 through 14, wherein the signal injection circuit configured to periodically input the check signal.

Example 16: The circuit of any combination of examples 11 through 15, wherein the power converter comprises a low drop out (LDO) regulator.

Example 17: The circuit of any combination of examples 11 through 16, wherein the signal injection circuit comprises: a current source; and a switch configured to control a duration of the check signal.

Example 18: The circuit of any combination of examples 11 through 17, wherein the signal injection circuit comprises a pull-down resistor configured to disable the output of the power converter.

Example 19: The circuit of any combination of examples 11 through 18, further comprising a deglitching circuit coupled to an output of the voltage monitoring circuit.

Example 20: A method includes injecting a check signal at an output terminal of a power converter circuit; monitoring, by a voltage monitoring circuit, an output voltage at the output terminal, detecting, by the voltage monitoring circuit, a fault signal at the output terminal based on the combined fault signal and the check signal satisfying a detection threshold outputting, by the voltage monitoring circuit and to processing circuitry, an indication that the voltage monitoring circuit detected the fault signal; in response to receiving the indication from the voltage monitoring circuit, placing, by the processing circuitry, the power converter into a fail-safe state.

Various examples of the disclosure have been described. These and other examples are within the scope of the following claims.

What is claimed is:

1. A system comprising:
   a power converter comprising an output terminal and configured to receive an input voltage at a first magnitude and output a voltage at a second magnitude at the output terminal;
   a voltage monitoring circuit coupled to the output terminal; and
   a signal injection circuit coupled to the output terminal of the power converter, the signal injection circuit configured to input a check signal at the output terminal;
   wherein the voltage monitoring circuit is configured to detect a fault signal at the output terminal based on the combined fault signal and the check signal exceeding a detection voltage threshold.

2. The system of claim 1, wherein the power converter is a first power converter comprising an input terminal, the system further comprising a DC-DC power converter coupled to the input terminal of the first power converter.

3. The system of claim 1, wherein the power converter is a first power converter, the system further comprising a second power converter wherein the second power converter is configured to receive a second input voltage of a third magnitude and output a voltage of a fourth magnitude at a second output terminal.

4. The system of claim 1, further comprising an output capacitor coupled to the output terminal, wherein the fault signal is an indication of a circuit issue related to the output capacitor.

5. The system of claim 4, wherein the circuit issue comprises a high impedance connection to the output capacitor.

6. The system of claim 1, further comprising processing circuitry configured to:
   cause the signal injection circuit to periodically input the check signal; and
   receive an indication from the voltage monitoring circuit that the voltage monitoring circuit detected the fault signal.

7. The system of claim 6, wherein in response to receiving the indication, the processing circuitry is configured to put the power converter in a fail-safe state.

8. The system of claim 6, wherein, in response to receiving the indication, the processing circuitry is configured to cause the power converter to power down.

9. The system of claim 1, wherein the power converter comprises a linear power converter.

10. The system of claim 1, wherein the power converter comprises a low drop out (LDO) regulator.

11. A circuit comprising:
    a power converter comprising an output terminal and configured to receive an input voltage at a first magnitude and output a voltage at a second magnitude at the output terminal;
    a voltage monitoring circuit coupled to the output terminal; and
    a signal injection circuit coupled to the output terminal of the power converter, the signal injection circuit configured to input a check signal at the output terminal,
    wherein the voltage monitoring circuit is configured to detect a fault signal at the output terminal based on the combined fault signal and the check signal exceeding a detection threshold.

12. The circuit of claim 11, further comprising processing circuitry configured to:
    cause the signal injection circuit to periodically input the check signal; and
    receive an indication from the voltage monitoring circuit that the voltage monitoring circuit detected the fault signal.

13. The circuit of claim 12, wherein in response to receiving the indication, the processing circuitry is configured to put the power converter in a fail-safe state.

14. The circuit of claim 12, wherein, in response to receiving the indication, the processing circuitry is configured to cause the power converter to power down.

15. The circuit of claim 11, wherein the signal injection circuit configured to periodically input the check signal.

16. The circuit of claim 11, wherein the power converter comprises a low drop out (LDO) regulator.

17. The circuit of claim 11, wherein the signal injection circuit comprises:
    a current source; and
    a switch configured to control a duration of the check signal.

18. The circuit of claim 11, wherein the signal injection circuit comprises a pull-down resistor configured to disable the output of the power converter.

19. The circuit of claim 11, further comprising a deglitching circuit coupled to an output of the voltage monitoring circuit.

20. A method comprising:
    injecting a check signal at an output terminal of a power converter circuit;
    monitoring, by a voltage monitoring circuit, an output voltage at the output terminal;
    detecting, by the voltage monitoring circuit, a fault signal at the output terminal based on the combined fault signal and the check signal exceeding a detection voltage threshold;
    outputting, by the voltage monitoring circuit and to the processing circuitry, an indication that the voltage monitoring circuit detected the fault signal; and
    in response to receiving the indication from the voltage monitoring circuit, placing, by the processing circuitry, the power converter into a fail-safe state.

* * * * *